United States Patent [19]

Jones

[11] 3,738,514

[45] June 12, 1973

[54] METHOD FOR HANDLING AND STACKING ARTICLES

[76] Inventor: Robert E. Jones, 15 S. Oak Forest Drive, Asheville, N. C. 28803

[22] Filed: June 16, 1971

[21] Appl. No.: 153,577

[52] U.S. Cl. ................. 214/152, 198/24, 214/6 A, 214/6 DK
[51] Int. Cl. ............................................ B65g 57/26
[58] Field of Search ................... 214/152, 6 A, 6 P, 214/6 DK, 6 G, 6 M, 6 N, 6 H; 198/24

[56] References Cited
UNITED STATES PATENTS

| | | | |
|---|---|---|---|
| 2,947,405 | 8/1960 | Fenton | 214/6 H X |
| 3,028,979 | 4/1962 | Zachow | 214/6 DK |
| 3,149,732 | 9/1964 | Gagnon et al. | 214/6 P |
| 3,278,048 | 10/1966 | Bruce | 214/6 P |
| 3,448,846 | 6/1960 | Bardenhagen | 214/6 N X |
| 3,491,901 | 1/1970 | Pearne et al. | 214/6 A |
| 3,608,746 | 9/1971 | Meyer | 214/6 A |
| 2,928,559 | 3/1960 | Mosely | 214/6 H |

*Primary Examiner*—Robert J. Spar
*Attorney*—Beveridge & De Grandi

[57] ABSTRACT

Articles such as bricks are loaded on one end of a horizontal endless loading conveyer in predetermined groups governed by trays fixed on the endless member of the conveyer. When the groups of articles reach a discharge station along the conveyer, they are sequentially discharged transversely of the conveyer onto a horizontal temporary support plate by paddle plates moved by an endless conveyer transversely overlying the first conveyer such that the articles are pushed by the paddle plates onto the temporary support plate. The temporary support plate overlies a vertical elevator and is retractable from below the discharged articles resting thereon to deposit the same on preceding articles stacked on the elevator. The elevator is then lowered a predetermined amount to make space for the next group of articles to be discharged after which the temporary support plate is moved back to its position overlying the elevator to receive the next group of articles to be discharged. When the elevator reaches its lower-most position, having received a full stack of articles, a push-off mechanism including a vertical pusher plate pushes the stacked articles from the elevator to an adjacent shuttle car which then is moved adjacent a further handling station such as a strapping station where a second push-off mechanism is actuated to push the stacked articles from the shuttle car into a strapping mechanism. The shuttle car then returns adjacent the elevator which then may be raised to a level below the temporary support plate for starting the next stacking operation. The entire system is hydraulically operated under the control of limit switches and timers. An interlocking arrangement of switches and timers ensures that the operation proceeds only when the various components of the system are in proper position. Where the articles are bricks for example and it is desired to form the stack of articles with voids therein for receiving the tines of a fork lift truck, certain trays on the loading conveyer are provided with fixed blocks signifying the position of the voids to the loader. Certain trays may be used for receiving articles which are defective and are discharged at the end of the loading conveyer separately from the normal discharge.

12 Claims, 3 Drawing Figures

INVENTOR
ROBERT E. JONES

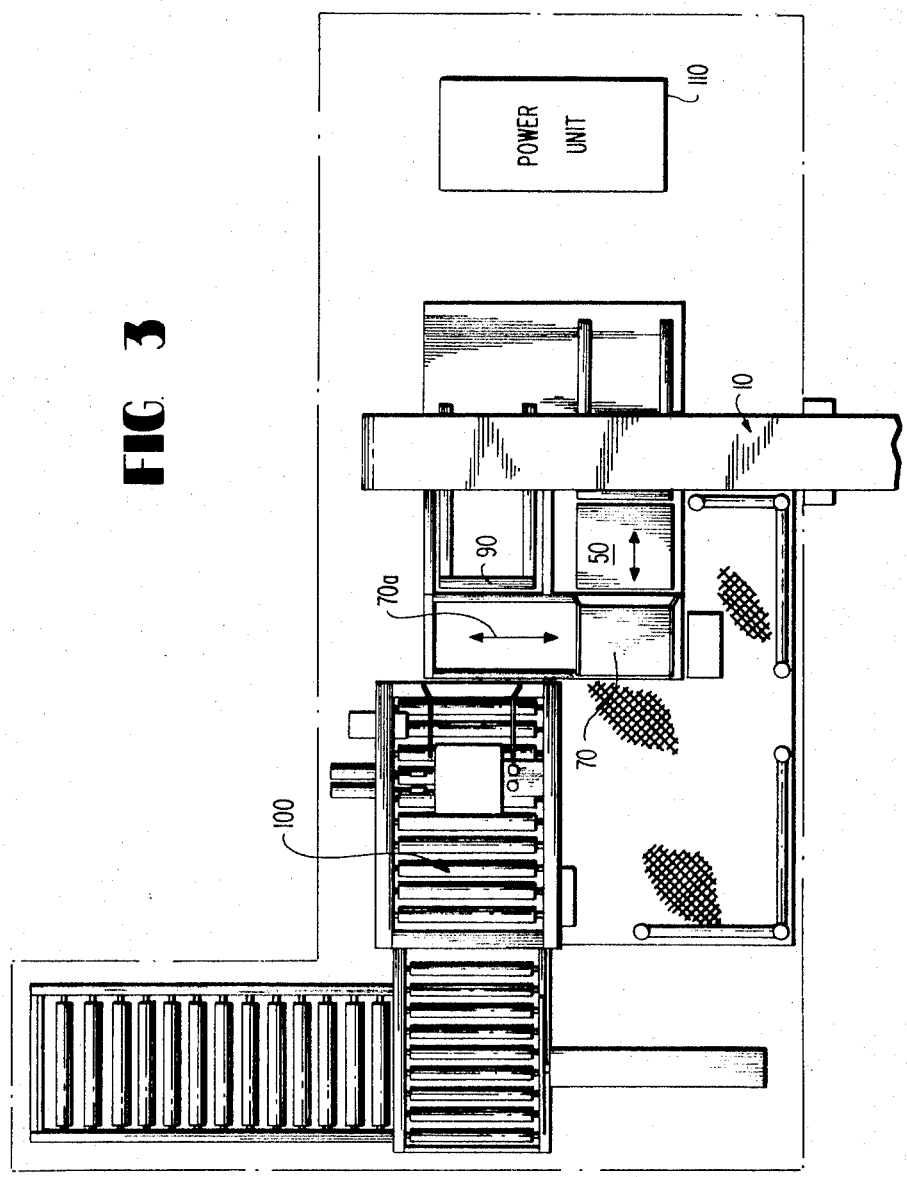

METHOD FOR HANDLING AND STACKING ARTICLES

OBJECTS OF INVENTION

This invention generally relates to article handling, and more specifically, to novel and improved method and apparatus for stacking articles into a multi-layered unit. Although the present invention has particular utility in connection with the stacking of bricks and similar articles, it need not be limited thereto.

It is a primary object of the present invention to provide method and apparatus for stacking a high volume of articles at a minimum time and without damaging the articles. Included herein is a provision of such a method and apparatus which may be applied to stacking articles such as bricks and which moreover will provide a standard brick stack containing voids for accommodating the tines of a fork lift truck, one such stack containing 10 layers of bricks with each layer containing 11 rows of brick.

A further object of the present invention is to provide such a method and apparatus for handling and stacking articles which may be entirely automated and easily supervised by one person.

A further object of the present invention is to provide such a method and apparatus for stacking articles wherein the articles may be placed into a predetermined arrangement without requiring any mental calculations or special skill and wherein the articles will be maintained in proper interrelationship with each other throughout the entire stacking operation.

A further object of the present invention is to provide such a method and apparatus wherein the articles are moved in translation from one station to another solely through horizontal translation rather than a combination of vertical and horizontal translation as is prevalent with conventional apparatus.

A further object of the present invention is to provide such a method and apparatus that is highly suitable for stacking articles such as bricks and for delivering them to a steel strapping mechanism of any conventional type.

A still further object of the present invention is to provide such an apparatus which is relatively compact requiring a minimum of space in a plant and which is feasible for commercial use. Included herein is a provision of such apparatus which may be manufactured with durability and operated over long periods of repeated use without serious breakdown.

SUMMARY OF INVENTION

In one embodiment of the invention, articles such as bricks are loaded on one end of a horizontal endless loading conveyer in predetermined groups governed by trays fixed on the endless member of the conveyer. When the groups of articles reach a discharge station along the conveyer, they are sequentially discharged transversely of the conveyer onto a horizontal temporary support plate by paddle plates moved by an endless conveyer transversely overlying the first conveyer such that the articles are pushed by the paddle plates onto the temporary support plate. The temporary support plate overlies a vertical elevator and is retractable from below the discharged articles resting thereon to deposit the same on preceding articles stacked on the elevator. The elevator is then lowered a predetermined amount to make space for the next group of articles to be discharged after which the temporary support plate is moved back to its position overlying the elevator to receive the next group of articles to be discharged. When the elevator reaches its lower-most position, having received a full stack of articles, a push-off mechanism including a vertical pusher plate pushes the stacked articles from the elevator to an adjacent shuttle car which then is moved adjacent a further handling station such as a strapping station where a second push-off mechanism is actuated to push the stacked articles from the shuttle car into a strapping mechanism. The shuttle car then returns adjacent the elevator which then may be raised to a level below the temporary support plate for starting the next stacking operation. The entire system is hydraulically operated under the control of limit switches and timers. An interlocking arrangement of switches and timers ensures that the operation proceeds only when the various components of the system are in proper position. Where the articles are bricks for example and it is desired to form the stack of articles with voids therein for receiving the tines of a fork lift truck, certain trays on the loading conveyer are provided with fixed blocks signifying the position of the voids to the loader. Certain trays may be used for receiving articles which are defective and are discharged at the end of the loading conveyer separately from the normal discharge.

DRAWINGS

The above will become more apparent from the following more detailed description taken in conjunction with the attached drawings in which:

FIG. 3 is a plan view of a portion of the apparatus.

DETAILED DESCRIPTION

Figure 1:
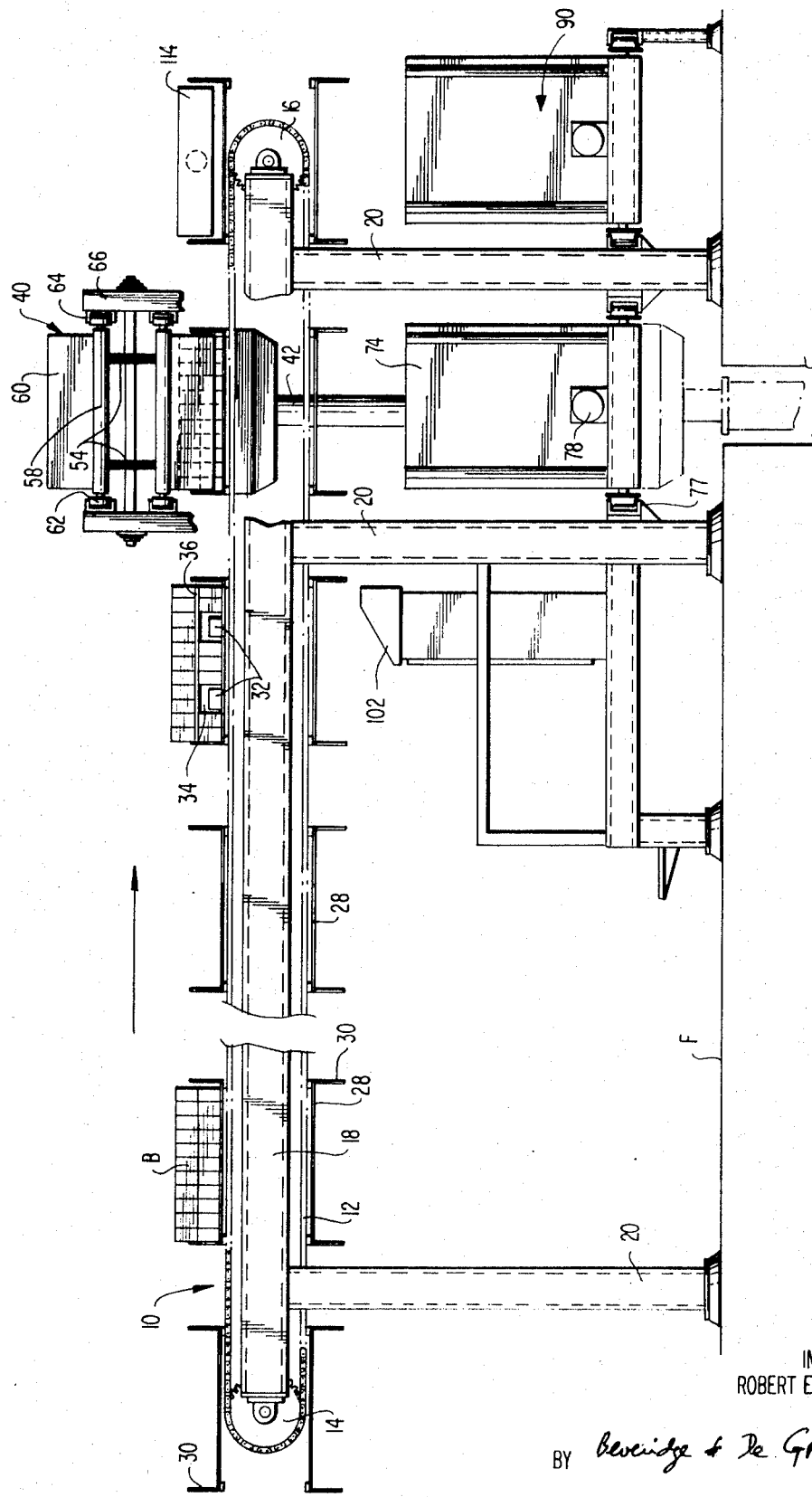
FIG. 1 is a side elevational view of apparatus embodying the present invention for stacking and handling articles such as bricks.

Referring now to the drawings in detail, there is shown for illustrative purposes only, apparatus for stacking and handling articles such as bricks B; the apparatus including a loading conveyer generally designated 10 having side-by-side endless drive chains 12 trained about end sprockets 14 and 16 suitably mounted in a horizontal frame 18 which may be made from structural steel with vertical structural steel columns 20 supporting conveyer 10 above the surface of a floor F to enable a conveyer or kiln car or other brick supporting vehicle (not shown) to be moved transversely below conveyer 10. Chains 12 include rollers 22 movable along an upper run over guide tracks 24 which may be angle irons, and movable along a lower run on guide tracks 26 supported on structural steel arms 27; tracks 24 and arms 27 being suitably fixed to vertical columns 20 of the frame.

Figure 2:
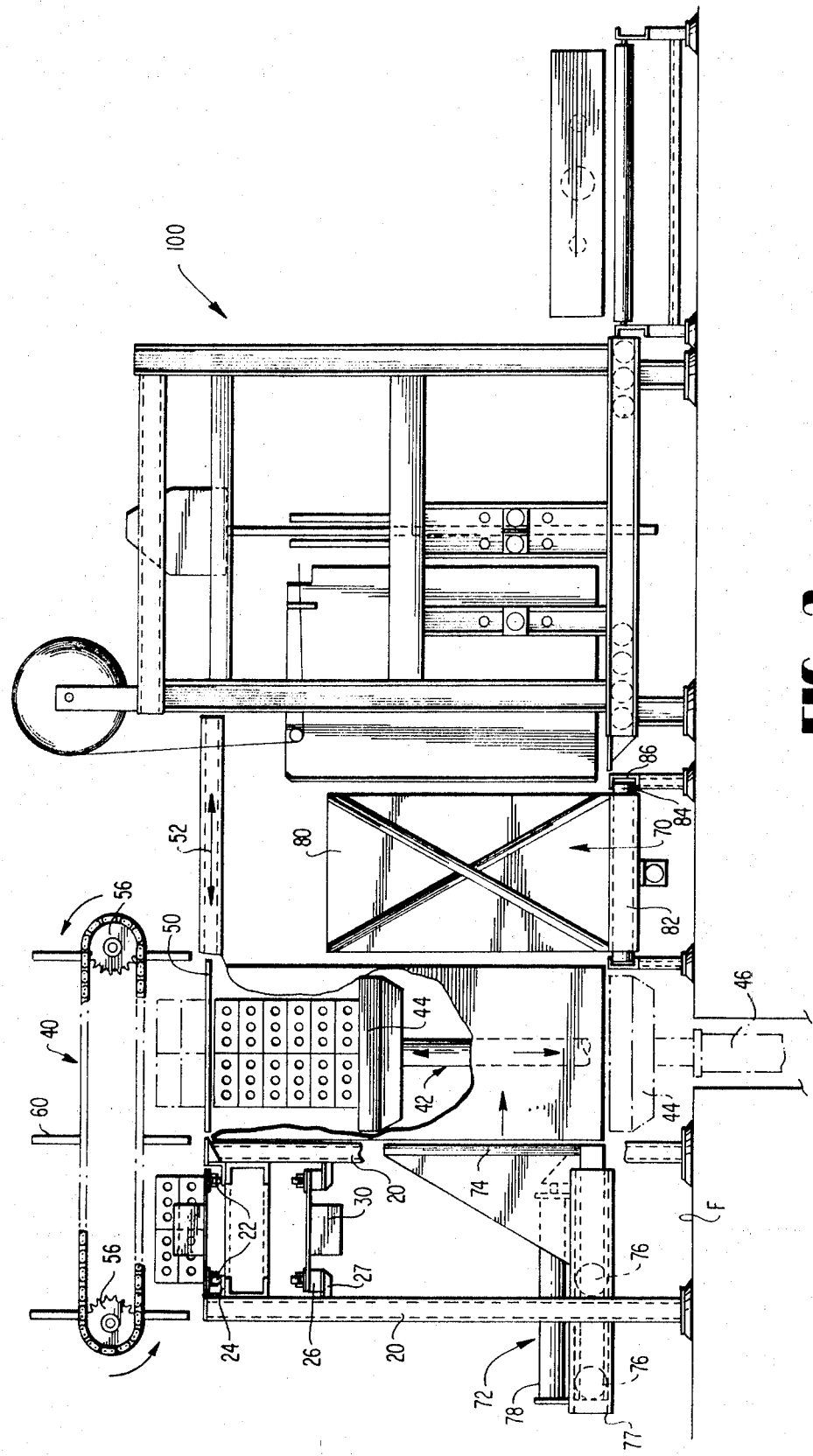
FIG. 2 is an end elevational view of the apparatus shown in FIG. 1.

Bricks B are loaded onto loading conveyer 10 manually or automatically in predetermined groups through the use of trays each including a horizontal base portion 28 suitably secured on cross-slats fixed to drive chains 12, and end walls 30 upstanding from the tray base 28. For reasons to become apparent subsequently, the spacing of trays 28, 30 is predetermined to harmonize with the overall speed and sequence of operation. Additionally, the longitudinal dimension between the end walls 30 of the trays is chosen to correspond to the desired number of rows of articles in each ultimate stack of articles. In the case of bricks, the space is such as to enable 11 rows of bricks to be placed between the end walls 30 of the trays as shown in FIG. 1 Additionally, in the specific form illustrated, each row loaded on conveyer 10 includes two bricks B abutting end-to-end and there are two courses or layers of such bricks loaded on conveyer 10 as illustrated in FIGS. 1 and 2. It will be obvious that other arrangements of articles may be loaded on conveyer 10 and handled in accordance with the present invention. To render the distance between end walls 30 of the trays adjustable, the end walls may be provided with attachment blocks (not shown) for increasing or decreasing the distance between end walls 30 of each tray thereby changing the article capacity of each tray. In situations where it is desired to form voids in the article stack, such as in the case of brick stacks where the voids are used to accommodate the tines of a fork lift, the base 28 of each tray or of a preselected number of trays is provided with void forming blocks 32 secured to the base 28 in predetermined spaced position to signify to the loader that no bricks are to be placed in the areas of the blocks. FIG. 1 illustrates such blocks 32 and the voids 34 which may be formed. To provide support between adjacent layers or courses of brick containing voids 34, a board 36 is interposed over the first course loaded on the conveyer prior to loading the second or upper course.

Prior to reaching the far end of conveyer 10, bricks B stacked thereon are discharged transversely from the trays by a tray unloader generally designated 40 for deposit on a elevator 42 having a top horizontal brick receiving platform 44 and being actuated by hydraulic means generally designated 46 which in the shown embodiment is recessed in floor F (see FIG. 2). Tray unloader 40 functions to push the bricks from trays 28, 30 transversely from conveyer 10 to an area overlying the preceding group of bricks previously discharged onto elevator 42. However, subsequent to deposit on the preceding group of bricks on elevator 42, the bricks are pushed onto a temporary support plate 50 which is suitably mounted in a horizontal plane for reciprocating movement in a horizontal plane between an active position wherein it overlies elevator 42 and the bricks stacked on the elevator, and an inactive position wherein it is retracted to one side of the elevator in the area designated by the double arrow 52 in FIG. 2; the arrow indicating the direction of movement of plate 50.

It will be seen that when plate 50 is in its active or operative position overlying the bricks stacked on elevator 42, the bricks may be discharged from the trays of the conveyer 10 and onto plate 50 without affecting the position or arrangement of the bricks on elevator 42. Subsequently, plate 50 may be retracted out from under the bricks deposited thereon, to one side of elevator 42 thus depositing the latter bricks by gravity onto the previously stacked bricks on elevator 42.

Tray unloader 40 transversely overlies loading conveyer 10 and includes a pair of side-by-side endless drive chains 54 trained about end sprockets 56 to move horizontally in vertical planes transversely over conveyer 10. Bricks B on trays 28, 30 are engaged and pushed off from the trays and onto temporary support plate 50 by vertical members shown as rectangular flat plates 60 which may be termed "paddle plates" fixed along their inner side edges to a carrier 58 which in turn extends transversely of drive chains 54 and is suitably fixed thereto to be driven in horizontal planes along upper and lower runs. Paddle plate carriers 58 are guided by guide member 62 fixed at opposite ends thereof and received in tracks 64 which may be channel members suitably secured to the frame 66. It will be seen that when paddle plates 60 move along the lower run of conveyer 40, they will be in a position to engage the bricks on the tray and push the same transversely off conveyer 10 and onto temporary support plate 50. After each paddle plate 60 performs its pushing function, it will continue and move about the upper run of conveyer 40 as indicated in FIG. 2 until it again moves along its lower run to fulfill a next discharge function. The number and spacing of paddle plates 60 is predesigned to accommodate the speed and sequence of the various steps included in the overall stacking operation. In cases where blocks 32 are employed on the trays to signify that a void is to be created as described above, the blocks are designed in depth such that paddle plates 60 will move over the top of the blocks 32 without engaging the blocks to avoid interference.

After temporary support plate 50 is retracted out from under a group of bricks loaded thereon by paddle plates 60, elevator 42 is lowered a predetermined amount which may be governed by a timer (not shown) which upon the expiration of its timing movement, trips a switch causing temporary support plate 50 to return to its active position overlying elevator 42 to receive the next group of bricks to be discharged from the trays by paddle plates 60. Once temporary support plate 50 returns to its operative position over elevator 42, a limit switch is actuated causing the elevator to rise to its proper position just below plate 50 to receive the next group of bricks when plate 50 is subsequently retracted. Suitable limit switches are provided to be actuated when elevator 42 rises to its proper position relative to plate 50 to stop the elevator at the proper position. Similarly and although not shown, suitable limit switches are provided to be engageable by trays 28, 30 to initiate operation of tray unloading conveyer 40. Retraction of the temporary support plate 50 to its inoperative position causing deposit of bricks onto the elevator is initiated by a limit switch engageable by a member driven by the tray unloading conveyer 40. Furthermore, certain of the various switches may be interlocked to ensure that the next step in the operation will not proceed unless the various elements are in their proper position at the proper time. For example, interlock switches are provided for initiating operation of unloading conveyer 40 only when plate 50 is in proper operative position over elevator 42 and the tray 28, 30 is properly positioned adjacent plate 50.

When elevator 42 reaches its lower-most position, a predetermined number of layers of bricks having been stacked thereon, a limit switch is actuated to initiate the discharge of the entire stack of bricks from elevator 42 to a shuttle car generally designated 70 situated adjacent elevator 42 as illustrated in FIG. 2. Such discharge is achieved through a pusher mechanism generally designated 72 including a flat vertical wall 74 mounted on a base including rollers 76 received in a track 77 to be reciprocable horizontally over the elevator platform 44 to push the brick stack onto shuttle car 70. Any suitable hydraulic actuator 78 may be utilized to reciprocate wall 74.

Shuttle car 70 includes a flat base 82 with opposite end walls 80 projecting upwardly from the base to define a space for receiving stacked bricks from elevator platform 44. The base of the shuttle car includes rollers 84 mounted in a track 86 which may be channel members, for guiding the shuttle car 70 between the position shown in FIGS. 2 and 3 adjacent the elevator and a position aligned with the inlet of a steel strapping station generally designated 100. Arrow 70a in FIG. 3 indicates the direction of shuttle movement of shuttle car 70. When shuttle car 70 reaches the strapping station 100, a second pusher mechanism 90 similar to 72 is employed for discharging the bricks from shuttle car 70 into the inlet of a strapping machine at station 100.

In the control of the operation, another interlock switch (not shown) is provided which will be energized only when the shuttle car 70 is positioned adjacent elevator 42 and the elevator 42 is in its lower-most position. Only when this condition occurs, will the pusher mechanism 72 be actuated to discharge the bricks from the elevator to the shuttle car. An operator deck containing a console 102 may be provided as shown in FIGS. 1 and 3 from which the various operations of the apparatus may be monitored and controlled by a single operator. Inasmuch as the functioning of the various components of the apparatus are primarily based on the speed of unloading conveyer 10, a control is provided on console 102 enabling the speed of unloading conveyer 10 to be adjusted as desired. All the components of the entire apparatus may be operated hydraulically through a power unit 110 illustrated in FIG. 3. Although illustrated, the strapping apparatus 100 itself forms no part of the present invention and therefore need not be described in any detail.

What is claimed is:

1. A method of handling and stacking bricks comprising the steps of: loading a group of bricks in discrete trays longitudinally spaced on a horizontally moving conveyor at a loading station with each group including a plurality of layers of bricks, each layer including a plurality of rows with each row including a number of bricks in end-to-end relationship with the long dimension of the bricks extending transversely of the direction of movement of the conveyor, moving the conveyor to transport the group of bricks to a discharge station spaced from the loading station, moving a pusher member transversely through the tray at the discharge station to engage the group of bricks and push the same as a unit laterally off the conveyor and onto a temporary support plate situated to one side of the conveyor at the discharge station generally in the same horizontal plane as the surface of the conveyor, and moving the plate in a horizontal plane out from under the group of bricks to deposit the group of bricks by gravity on a stack of bricks previously discharged from the conveyor through means of the pusher member and the plate.

2. The method defined in claim 1 further including the step of lowering the stack of bricks, moving the plate in a horizontal plane back to its initially defined position adjacent the discharge station for receiving a subsequent group of bricks from the conveyor, and then raising the stack of bricks towards the plate to a position closely adjacent the underside of the plate to receive the next group of bricks upon retraction of the plate.

3. The method defined in claim 2 further including the step of controlling discharge of the group of bricks from the conveyor to the plate through means of said trays so that when the trays reach the discharge station, the pusher member will be actuated to move through the tray at the discharge station to discharge the group of bricks therein onto said plate.

4. The method defined in claim 3 further including the step of controlling movement of the plate through the lowering of the stack of bricks so that when the stack of bricks is lowered a predetermined amount, the plate will move to the position adjacent the discharge station for receiving a group of bricks from the conveyor.

5. The method defined in claim 4 further including the step of controlling discharge of the group of bricks from the tray to the plate so that said discharge will occur only when the tray is at said discharge station and said plate is in proper position adjacent the discharge station to receive the group of bricks.

6. The method defined in claim 1 further including the step of forming voids in certain rows of bricks in one of the layers while on the conveyor prior to discharging the group of bricks at the discharge station onto said plate.

7. The method defined in claim 1 including the step of moving said plate at right angles to said conveyor for depositing the group of bricks onto the stack.

8. The method defined in claim 1 wherein the bricks are stacked on an elevator movable vertically below said plate and wherein the stacked bricks are pushed from the elevator to a shuttle car positioned laterally outwardly from the elevator and wherein the plate moves at right angles to the conveyor path from adjacent the discharge station to an area overlying the shuttle car for depositing the group of bricks onto the stack of bricks.

9. The method defined in claim 1 including the steps of successively loading successive trays with bricks in said groups, and employing a plurality of pusher members fixed on an endless drive member to move through successive trays at said discharge station to successively push groups of bricks from said trays at said discharge station.

10. A method of handling and stacking bricks comprising: the steps of loading the bricks on discrete trays on a conveyor at a loading station, the conveyor being movable along a horizontal path to successively move the trays from the loading station to a discharge station spaced therefrom, and the bricks being loaded on the tray in a discrete predetermined group; advancing the conveyor along said horizontal path to position the tray with the group of bricks therein at said discharge station, moving a pusher member transversely through the tray at said discharge station to push the entire group of bricks as a unit transversely off the conveyor onto a temporary support plate positioned in a horizontal plane adjacent said discharge station, and moving said temporary support plate in a horizontal plane out from under said group of bricks thereon to deposit said group of bricks by gravity onto a stack of bricks previously discharged from the conveyor through means of the pusher member and plate.

11. The method defined in claim 10 further including the step of lowering the stack of bricks, moving the plate in a horizontal plane back to the position overlying the stack of bricks adjacent said discharge station, and raising the stack of bricks to a predetermined position closely adjacent the underside of said plate for receiving a next group of bricks to be discharged from said conveyor onto said plate and ultimately deposited by said plate on said stack.

12. The method of handling and stacking bricks defined in claim 10 further including the steps of loading the bricks in the tray in a number of rows, and forming voids in certain rows of bricks while on the conveyor at a station intermediate the loading and discharge stations, and discharging said rows of bricks containing the voids at said discharge station in the manner aforesaid.

* * * * *